Patented Mar. 19, 1946

2,396,763

UNITED STATES PATENT OFFICE 2,396,763

MODIFIED OIL

Harry M. Ullmann, Bethlehem, Pa.

No Drawing. Application December 20, 1943,
Serial No. 515,030

17 Claims. (Cl. 260—404.8)

The present invention relates to a modified castor oil product and the process of making the same.

A purpose of my invention is to produce a clear yellowish liquid castor oil product somewhat more viscous than castor oil, soluble in castor oil, readily soluble in cold turpentine, and soluble in a water solution of alkali which is then capable of dispersing castor oil in water.

A further purpose is to produce an improved plasticizer, textile softener, cutting compound, finish or polish from castor oil and to incorporate castor oil in a polar complex.

A further purpose is to react together castor oil and maleic anhydride under conditions which will prevent the formation of an alkyd resin and of a rubber-like plastic, but which will beneficially modify the chemical and physical properties of the castor oil.

A further purpose is to react castor oil with from 5% to 20% of maleic anhydride, preferably from 5% to 15% and most desirably about 10% at between 95° and 140° C., preferably between 105° and 120° C., and most desirably between 105° and 110° C., for a time of at least one hour and preferably not exceeding twelve hours, desirably between two and six hours, and then desirably to neutralize the reaction product with an alkali, alcohol, metal, salt or the like.

Further purposes appear in the specifications and in the claims.

In the prior art, several workers have reacted castor oil and maleic anhydride under various conditions of concentration, temperature, and time to obtain products falling into one of the following classes:

1. Alkyds, obtained ordinarily by reacting at temperatures of 165° C. or above, usually at 250° C. or above. These materials are viscous resins. The reaction in this case of course involves the acidic group of the maleic anhydride and hydroxyl group of the oil molecule (castor oil is hydroxylated).

2. Rubber-like plastics obtained from high concentrations of maleic anhydride reacting with castor oil at lower temperatures, as in Daimler German Patent 479,965.

By varying the reacting conditions, I have discovered that it is possible to obtain modified castor oil products which are totally different from the above classes of materials, and which appear to be more closely related to the Clocker reaction products obtained with non-hydroxylated oils, as described in U. S. Patents 2,188,882 to 2,188,890 inclusive, and in U. S. Patent 2,275,843, in which the maleic anhydride combines with the fatty acid carbon chain, suitably at a double bond in the oil. By the technique herein described, it is possible substantially to avoid the usual alkyd reaction, notwithstanding that the maleic anhydride is acidic and the castor oil is hydroxylated.

The product of the invention is not in any sense a rubber-like mass. Superficially it resembles the original oil in being clear, yellowish, completely liquid, and more viscous than castor oil. It is soluble in castor oil, in cold methyl or ethyl alcohol and is completely and readily soluble in either hot or cold turpentine.

When neutralized by an alkali such as ammonia, substituted ammonium compounds, sodium hydroxide, potassium hydroxide, or the like, preferably in water solution, the product of the invention is readily soluble in water, and forms stable emulsions of untreated castor oil, linseed oil, corn oil, olive oil, cotton seed oil or the like, in water. The neutralization need not be complete, but may be only partial, forming for example the half-salt rather than the completed salt, if desired.

Similarly, as later explained, the modified castor oil will form esters or partial esters and salts or partial salts with metals.

As well known, maleic acid may be used as a source of maleic anhydride. Also, as clearly set forth in the Clocker patents above referred to, fumaric acid or citraconic acid or other materials yielding maleic anhydride may be employed.

In order to obtain the product of the invention, I react castor oil with from 5% to 20% of maleic anhydride at between 95° and 140° C. for at least one hour. Since the reaction between the maleic anhydride and the castor oil is desired, substantial quantities of other reactants which would interfere with the reaction should be avoided.

The percentage of maleic anhydride will preferably be 5% to 15% of the castor oil, and best results are obtained with about 10%. The best temperature range is 105° to 120° C. The time should preferably not exceed twelve hours. The time of between two and six hours is preferred.

When the reaction between the castor oil and the maleic anhydride is effectively complete, the reaction product will be desirably cooled to room temperature and used as such or it may be reacted with a polar reactive compound. The polar reactive compound will desirably be an alkali such as ammonium hydroxide, a substituted ammonium hydroxide (tetra methyl ammonium hydroxide, trimethyl ethyl ammonium hydroxide, or tetra ethyl ammonium hydroxide), an alkali metal hydroxide (sodium or potassium hydroxide), or an amine (triethyl amine, trimethyl amine, diethyl methyl amine).

The polar reactive compound may also be a mono- or poly-hydric alcohol (including di-hydric or tri-hydric), such as methyl, ethyl or propyl alcohol, ethylene glycol, glycerol or penta-erythritol, or a metal or salt of a metal such as metallic manganese, cobalt, iron, copper, vanadium, magnesium, aluminum or the oxide, carbonate or acetate thereof. The modified castor oil may be combined with basic dyestuffs to form a complex for dyeing leather, textiles, and the like. Suitable basic dyestuffs are described in the Clocker patents above referred to.

The unreacted modified castor oil is useful as a plasticizer, textile softener, cutting compound, polish or finish, in which the reactivity of the acidic groups of the maleic anhydride can be used to great advantage as explained in the Clocker patents above referred to.

The neutralized ammonia, substituted ammonium, amine, or other alkali salt may be used as a dispersing agent, as to disperse unmodified castor oil, linseed oil, corn oil, olive oil, cotton seed oil or the like, in water.

The ester or half ester obtained with one of the alcohols as above mentioned exhibits a configuration suggesting an alkyd of a new type, since the alcohol is coupled to the carbon chain of the fatty acid through the maleic group. These compounds may be used as resin ingredients, plasticizers or softeners for lacquers or varnishes.

A very desirable feature of the complex formed by heating modified castor oil with glycerol is that the viscosity of the resulting softener can be controlled with great accuracy and over a wide range by varying the time of reaction of the modified castor oil with the glycerol from a minimum of one hour to a maximum of forty hours or more at a temperature range of from 100° to 180° C., preferably 105° to 120° C. Thus after thirty-one hours at 110° C., the resulting complex although highly viscous, is still readily soluble in cold methyl or ethyl alcohol. It is thus possible to obtain close control on viscosity of a lacquer plasticizer while insuring flexibility in the resultant film. The concentration of glycerol is preferably between one and two mols of glycerol per mol of complex, one and one-half mols of glycerol being most desirable.

In a typical example, 1000 grams of No. 3 castor oil was heated with 110 grams of maleic anhydride at 100° to 107° C., for ten hours in a flask equipped with an air condenser. At the beginning of the reaction, the mixture was shaken to dissolve the maleic anhydride.

The iodine number of the untreated castor oil was 90; that of the reaction product was 30 to 33. The acid number of the reaction product was 57.2 (55 to 59 typical). The properties of the acidic product and the salt or ester obtained after further reaction were as described above.

From the behavior of the product, it appears that in the initial reaction the maleic anhydride has coupled with the carbon chain of the fatty acid of the castor oil suitably at a double bond without neutralizing the acidic groups of the maleic anhydride.

In esterification, the temperature used may in some cases be as high as 180° C., but for many reactions 110° C. will suffice; thus, in one example, the modified castor oil (10% maleic anhydride) combines with glycerol in the proportions of one and one-half mol of modified oil to one mol of glycerol at 110° C. after fifteen hours stirring in a flask.

Wherever castor oil is referred to herein, it is intended to designate raw castor oil, commonly known as No. 1 or as No. 3 castor oil, rather than castor oil which has been dehydrated so as to eliminate the hydroxyl groups.

In view of my invention and disclosure variations and modification to meet individual whim or particular need will doubtless become evident to others skilled in the art, to obtain all or part of the benefits of my invention without copying the product or process shown, and I, therefore, claim all such insofar as they fall within the reasonable spirit and scope of my claims.

Having thus described my invention, what I claim as new and desire to secure by Letters Patent, is:

1. The process of modifying raw castor oil, which comprises reacting raw castor oil with from 5% to 20% of maleic anhydride at between 95° and 140° C. in the substantial absence of other reactants for at least one hour.

2. The process of modifying raw castor oil, which comprises reacting raw castor oil with from 5% to 20% of maleic anhydride at between 95° and 140° C. in the substantial absence of other reactants for at least one hour and neutralizing the reaction product with an alkali.

3. The process of modifying raw castor oil, which comprises reacting together essentially raw castor oil and from 5% to 15% of maleic anhydride at between 95° and 140° C. for from one to twelve hours.

4. The process of modifying raw castor oil, which comprises reacting together essentially raw castor oil and from 5% to 20% of maleic anhydride at between 95° and 140° C. for from one to twelve hours and then reacting the modified oil with a polar reactive substance.

5. The process of modifying raw castor oil, which comprises reacting together essentially raw castor oil and from 5% to 15% of maleic anhydride at between 95° and 140° C. for at least one hour and neutralizing the reaction product with an alkali.

6. The process of modifying raw castor oil, which comprises reacting together essentially raw castor oil and from 5% to 15% of maleic anhydride at between 95° and 140° C. for at least one hour and esterifying the reaction product with an alcohol.

7. The process of modifying raw castor oil, which comprises reacting together essentially raw castor oil and from 5% to 15% of maleic anhydride at between 95° and 140° C. for from one to twelve hours and forming a metal salt of the reaction product.

8. The process of modifying raw castor oil, which comprises reacting together raw castor oil and substantially 10% of maleic anhydride at between 105° and 110° C. for at least one hour.

9. The process of modifying raw castor oil, which comprises reacting together raw castor oil and substantially 10% of maleic anhydride at between 105° and 110° C. for between one and twelve hours and neutralizing with ammonia.

10. The process of modifying raw castor oil, which comprises reacting together raw castor oil and substantially 10% of maleic anhydride at between 105° and 110° C. for between one and twelve hours and esterifying with glycerol.

11. The process of modifying raw castor oil, which comprises reacting together raw castor oil and from 5% to 20% of maleic anhydride at between 95° and 140° C. for at least one hour, and heating the reaction product with from one to two mols of glycerol for every mol of reaction product at 100° to 180° C. for from one to forty hours, depending upon the desired viscosity.

12. The process of modifying raw castor oil, which comprises reacting together raw castor oil and from 5% to 20% of maleic anhydride at between 95° and 140° C. for at least one hour, and combining the reaction product with a basic dyestuff.

13. A clear yellowish modified raw castor oil in viscous liquid form consisting of raw castor oil combined at a temperature between 95° and 140° C. after reaction for at least one hour with from 5% to 20% of maleic anhydride, soluble in raw castor oil, readily soluble in cold turpentine, soluble in alcohol and soluble in water solution of alkali.

14. The reaction product of raw castor oil and from 5% to 20% of maleic anhydride, reacted at a temperature between 95° and 140° C. for at least one hour, soluble in raw castor oil and readily soluble in cold turpentine.

15. An alkali salt of the reaction product of raw castor oil and from 5% to 15% of maleic anhydride, reacted at a temperature between 95° and 140° C. for between one and twelve hours, soluble in water and having the property of dispersing oils in water.

16. An ester of the reaction product of raw castor oil and from 5% to 15% of maleic anhydride, reacted at a temperature between 95° and 140° C. for more than one hour, and having the property of acting as a plasticizer.

17. A modified raw castor oil product consisting of the reaction product at the carbon chain of the oil, of raw castor oil and substantially 10% of maleic anhydride at 105° to 140° C. for at least one hour.

HARRY M. ULLMANN.